(12) United States Patent
Rosales et al.

(10) Patent No.: US 12,468,037 B2
(45) Date of Patent: Nov. 11, 2025

(54) DETERMINING A PITCH ANGLE POSITION OF AN ACTIVE OPTICAL SENSOR SYSTEM

(71) Applicant: Valeo Schalter und Sensoren GmbH, Bietigheim-Bissingen (DE)

(72) Inventors: Javier Rosales, Porriño (ES); Nikolai Sergeev, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 989 days.

(21) Appl. No.: 17/622,988

(22) PCT Filed: Jun. 23, 2020

(86) PCT No.: PCT/EP2020/067435
§ 371 (c)(1),
(2) Date: Dec. 27, 2021

(87) PCT Pub. No.: WO2020/260242
PCT Pub. Date: Dec. 30, 2020

(65) Prior Publication Data
US 2022/0260717 A1    Aug. 18, 2022

(30) Foreign Application Priority Data

Jun. 27, 2019    (DE) .................. 10 2019 117 312.4

(51) Int. Cl.
*G01S 17/89* (2020.01)
*G01S 7/481* (2006.01)
*G01S 17/931* (2020.01)

(52) U.S. Cl.
CPC ............ *G01S 17/89* (2013.01); *G01S 7/4814* (2013.01); *G01S 7/4816* (2013.01); *G01S 7/4817* (2013.01); *G01S 17/931* (2020.01)

(58) Field of Classification Search
CPC ...... G01S 17/89; G01S 7/4814; G01S 7/4816; G01S 7/4817; G01S 17/931; G01S 7/4972
See application file for complete search history.

(56) References Cited

U.S. PATENT DOCUMENTS 5,988,862 A * 11/1999 Kacyra ............... G01C 15/002
                                                        702/155
9,052,721 B1 * 6/2015 Dowdall ............... G05D 1/024
(Continued)

FOREIGN PATENT DOCUMENTS

CN        109696663 A      4/2019
JP        2015075382 A     4/2015
(Continued)

OTHER PUBLICATIONS

DE 102018117937 A1 with English translation; date filed Jul. 25, 2018; date published Jan. 30, 2020. (Year: 2020).*
(Continued)

*Primary Examiner* — Calvin Cheung
(74) *Attorney, Agent, or Firm* — Osha Bergman Watanabe & Burton LLP

(57) ABSTRACT

According to a method for determining a pitch angle position of an active optical sensor system (2), which is mounted on a motor vehicle (1), a scatter plot (6) is generated by means of the sensor system (2). The scatter plot (6) includes a first and a second subset (7a, 7b) of scan points of the roadway (13). A first pair (A, B) of scan points is identified by means of a computing unit, wherein a point (A) is part of the first subset (7a), a further point (B) is part of the second subset (7b), and a projection (14') of a first connection vector (14) of the first pair (A, B) is in a transmission plane parallel to a longitudinal axis of the sensor system (2). A first angle (δ) which encloses the first connection vector (14) with the longitudinal axis (15) of the sensor system (2) is determined by means of the computing unit (4).

12 Claims, 3 Drawing Sheets

(56) References Cited

U.S. PATENT DOCUMENTS

| | | |
|---|---|---|
| 10,298,910 B1 | 5/2019 | Kroeger |
| 2006/0092004 A1 | 5/2006 | Klotz et al. |
| 2010/0020074 A1* | 1/2010 | Taborowski ....... G01C 21/3837 |
| | | 345/420 |
| 2019/0178989 A1 | 6/2019 | Tsai et al. |
| 2020/0348402 A1* | 11/2020 | Ye .......................... G01S 17/42 |

FOREIGN PATENT DOCUMENTS

| | | |
|---|---|---|
| WO | 2004036248 A2 | 4/2004 |
| WO | 2018166956 A1 | 9/2018 |

OTHER PUBLICATIONS

DE 102018112407 A1 with English translation; date filed May 24, 2018; date published Nov. 28, 2019. (Year: 2019).*
DE 102017105209 A1 with English translation; date filed Mar. 13, 2017; date published Sep. 13, 2018. (Year: 2018).*
DE 102017106484 A1 with English translation; date filed Mar. 27, 2018; date published Sep. 27, 2018. (Year: 2018).*
International Search Report and Written Opinion in corresponding International Application No. PCT/EP2020/067435, mailed Oct. 12, 2020 (11 pages).
German Search Report issued in corresponding German Application No. 10 2019 117 312.4, dated May 15, 2020 (4 pages).
Office Action issued in counterpart Chinese Patent Application No. 202080053986.2 mailed Feb. 19, 2025 (24 pages).

* cited by examiner

DETERMINING A PITCH ANGLE POSITION OF AN ACTIVE OPTICAL SENSOR SYSTEM

The invention relates to a method for determining a pitch angle position of an active optical sensor system, which is mounted on a motor vehicle located on a roadway. The invention further relates to a corresponding active optical sensor system for being mounted on a motor vehicle, to a motor vehicle, to a computer program, and to a computer-readable storage medium.

Active optical sensor systems, such as lidar systems, can be mounted on motor vehicles in order to realize various functions of electronic vehicle guidance systems or driver assistance systems. These functions include distance measurements, distance control algorithms, lane keeping assistants, object tracking functions, and so on. Deviations of an installation position or installation orientation of the sensor system from a nominal orientation influence the accuracy of the measurement values or their interpretation and evaluation and thus the reliability and robustness of the corresponding functions. It is therefore necessary to calibrate the active optical sensor system in order to be able to compensate for corresponding orientation or position deviations.

Document U.S. Pat. No. 9,052,721 B1 describes a method for correcting the alignment of a laser scanner mounted on a vehicle. The method is based on comparing a three-dimensional point cloud of the laser scanner with a three-dimensional reference point cloud to calculate an incorrect alignment of the laser scanner. The reference point cloud has in this case previously been recorded by driving the vehicle or another vehicle along the roadway.

Consequently, the misalignment of the laser scanner can be compensated for only on the basis of measurement points if reference measurement points are available for the corresponding section of the roadway. However, the number of available measurement points or the frequency with which the calibration can be carried out has a decisive influence on the accuracy of the compensation of the orientation or position deviations. In addition, it is disadvantageous that the reference point cloud needs to be recorded in advance.

Against this background, it is an object of the present invention to provide an improved concept for determining a pitch angle position of an active optical sensor system, which does not need a previously recorded reference point cloud and with which in particular greater accuracy can be achieved.

According to the invention, this object is achieved by the respective subject matter of the independent claims. Advantageous developments and further refinements are the subject matter of the dependent claims.

The improved concept is based on the idea of generating two different subsets of scanning points of a roadway and determining a pair of scanning points from the different subsets, whose connection vector is projected into a transmission plane of the sensor system parallel to a longitudinal axis of the sensor system. The angle that the connection vector encloses with the longitudinal axis of the sensor system serves as a measure of the pitch angle position.

According to a first independent aspect of the improved concept, a method for determining a pitch angle position of an active optical sensor system is specified, wherein the sensor system is mounted on a motor vehicle located on a roadway. A point cloud containing a first subset of scanning points of the roadway and a second subset of scanning points of the roadway is generated by means of the sensor system. A first pair of scanning points is identified by means of a computation unit of the sensor system, wherein one point of the first pair is part of the first subset and a further point of the first pair is part of the second subset. A projection of a first connection vector of the first pair into a transmission plane of the sensor system is parallel to a longitudinal axis of the sensor system. A first angle, which the first connection vector encloses with the longitudinal axis of the sensor system, is determined by means of the computation unit in order to determine the pitch angle position.

A point being part of a subset can be understood to mean that the subset includes the corresponding point.

The connection vector is given in particular by a vector that has the point as the starting point and the further point as the end point.

Here and below, an active optical sensor system can be defined as such in that it has a transmission unit with a light source, in particular for emitting light or light pulses. The light source can in particular be in the form of a laser. Furthermore, an active optical sensor system has a reception unit with at least one optical detector, in particular for capturing light or light pulses, in particular reflected components of the emitted light. The active optical sensor system is configured in particular to generate and output one or more sensor signals based on the detected light.

Here and below, the term "light" can be understood to comprise electromagnetic waves in the visible, infrared, and/or ultraviolet spectral ranges. Accordingly, the term "optical" can also be understood to relate to light in this sense.

The light which is emitted by the active optical sensor system can in particular include infrared light, for example having a wavelength of 905 nm, approximately 905 nm, 1200 nm or approximately 1200 nm. This can mean in each case a wavelength range with a relatively broad distribution, which is typical of the corresponding light source.

In the present case of the active optical sensor system, the light source can be, for example, a laser light source. The wavelengths mentioned can, within the framework of customary tolerances, correspond for example to peak wavelengths of the laser spectrum.

The fact that the point cloud is generated by means of the sensor system can be understood to mean, for example, that at least one sensor signal is generated by means of the reception unit based on detected components of the reflected light and the computation unit generates corresponding scanning points of the point cloud based on the at least one sensor signal, with each scanning point containing a three-dimensional coordinate tuple of spatial domain coordinates, in particular in a sensor coordinate system of the sensor system.

The sensor system can for example include a deflection apparatus, for example with a movable or rotatably mounted mirror, by means of which light beams generated by the transmission unit can be deflected in a controlled manner.

In particular, the longitudinal axis of the sensor system, which defines for example an X-axis of the sensor coordinate system, corresponds to an emission direction of the light beams at an emission angle of zero degrees, that is to say for example for a neutral position of the deflection apparatus. The deflection apparatus can assume positions deviating from the neutral position in order to deflect the light beams such that the light beams emerge from the sensor system within the transmission plane.

A transverse axis of the sensor system, which defines for example a y-axis of the sensor coordinate system, lies within the transmission plane and is for example perpendicular to the longitudinal axis, which as per the design also lies within the transmission plane. A normal axis of the sensor system is perpendicular to the longitudinal axis and to the transverse axis of the sensor system. The normal axis of the sensor system defines for example a z-axis of the sensor coordinate system.

In other words, a viewing direction or emission direction of the sensor system in the neutral position is the same as the x-axis of the sensor coordinate system. The transmission plane is given by the XY plane of the sensor coordinate system. The sensor system can emit the light at different emission angles within the transmission plane.

The reflected components of the light can, for example, be received spatially resolved by means of the reception unit, with the result that, in addition to the different emission angles, different reception angles can also be captured and determined. In addition, a distance between the sensor system and a point or object at which the light was reflected can be determined, for example by means of a time-of-flight measurement, TOF. In this way it is possible to generate the point cloud as a three-dimensional point cloud, that is to say as a point cloud from three-dimensional spatial domain coordinate tuples.

The spatial resolution of the reception unit can be achieved, for example, by the reception unit having at least two optical detectors. The scanning points captured by means of one of the detectors are also referred to as layer. Layers that are due to reflections by the roadway are also referred to as ground layers or touchdown lines.

The first and the second subset are in particular different ground layers.

A longitudinal axis of the motor vehicle, which in particular defines an x-axis of a vehicle coordinate system, is given for example by a direction of travel of the motor vehicle in the neutral position of a steering system of the motor vehicle or when a steering angle, in particular a wheel angle or steering wheel angle, of the motor vehicle is zero degrees. A transverse axis of the motor vehicle is perpendicular to the longitudinal axis of the motor vehicle and lies in a plane that is parallel to the roadway, or parallel to a plane within which contact points of the wheels of the motor vehicle with the roadway lie. In particular, the transverse axis defines a y-axis of the vehicle coordinate system. A normal axis of the motor vehicle, which in particular defines a z-axis of the vehicle coordinate system, is perpendicular to the longitudinal axis and to the transverse axis of the motor vehicle.

An overall angular position of the sensor system can be defined, for example, by the pitch angle position, a yaw angle position, and a roll angle position of the sensor system. A pitch angle, a yaw angle, and a roll angle of the sensor system are defined in this case as a rotation angle or Euler angle of the sensor coordinate system with respect to the vehicle coordinate system according to a specified convention.

For example, the convention can be such that the sensor coordinate system results from the vehicle coordinate system through the following three rotations, where it is assumed that the sensor coordinate system and the vehicle coordinate system are initially identical: The sensor coordinate system is rotated by the yaw angle about the z-axis of the vehicle coordinate system. The resulting sensor coordinate system is then rotated by the pitch angle about the resulting y-axis of the resulting sensor coordinate system. The resulting sensor coordinate system is then rotated by the roll angle about the resulting x-axis of the resulting sensor coordinate system. Other conventions are likewise possible.

If the yaw angle and the roll angle are equal to zero, the pitch angle corresponds in particular to a rotation angle of the sensor coordinate system about the y-axis of the vehicle coordinate system.

The pitch angle position corresponds in particular to an estimated value or measurement value for the pitch angle of the sensor system.

To carry out the method for determining the pitch angle position according to the improved concept, it is assumed, for example, that the yaw angle is equal to zero or negligibly small or that the sensor system has been calibrated in advance with respect to the yaw angle. If a calibration with respect to the yaw angle was carried out in advance, the yaw angle position of the sensor system was determined in advance, for example by means of the computation unit. To generate the point cloud, the yaw angle position was then taken into account by correspondingly normalizing the spatial domain coordinates of the scanning points so that they were apparently generated by a sensor system with a vanishing yaw angle. Accordingly, it can be assumed here and below, without loss of generality, that the yaw angle is equal to zero.

In various embodiments, the method for determining the pitch angle position according to the improved concept includes the method steps for calibrating the sensor system with respect to the yaw angle.

The same can apply to the roll angle. However, the roll angle does not influence the determination of the pitch angle in the manner described according to the improved concept. It is therefore not necessary for the roll angle to be determined in advance. Accordingly, it can be assumed here and below, without loss of generality, that the roll angle is equal to zero.

Under the assumptions explained, the longitudinal axis of the sensor system lies in the xz-axis of the vehicle coordinate system. The pitch angle can thus also be understood to be the angle that the longitudinal axis of the sensor system encloses with the longitudinal axis of the motor vehicle.

The sensor system being mounted on the motor vehicle can, for example, be understood to mean that the sensor system is attached to the motor vehicle and can in particular also mean that the sensor system is partially or completely installed in the motor vehicle. It is ensured in any case that the transmission unit can emit the light into a surrounding area of the motor vehicle outside the motor vehicle and the reception unit can receive the reflected components.

The motor vehicle being located on the roadway can in particular be understood to mean that it is moving on the roadway or is standing on it.

The first and the second subset each contain at least two scanning points. The subsets each preferably contain a multiplicity of scanning points, that is to say for example a number of scanning points in the order of magnitude of a few tens, a few 100 or a few 1000 scanning points. In particular, the number of scanning points corresponds to a subset of the number of different emission angles for the light that are settable by means of the transmission unit or the deflection apparatus.

According to at least one embodiment, the deflection apparatus contains a mirror that is mounted rotatably about a rotation axis. The transmission unit, which can for example be mounted fixedly with respect to the sensor coordinate system, emits the light, which is incident on a defined point on the mirror and, depending on the angular or rotational position of the mirror, is emitted according to a defined emission angle within the transmission plane. The respective angular position of the mirror can be captured, for example, by means of a rotary encoder, which is arranged on a shaft or is coupled to the shaft, which is aligned along the rotation axis of the mirror.

In alternative embodiments, the deflection apparatus can have a mirror element that is tiltable or pivotable about one or two axes for deflecting the light in the transmission plane. The mirror element can be designed, for example, as a microelectromechanical system, MEMS.

The first pair of scanning points consists in particular of the point and the further point of the first pair. The corresponding statement, to be precise that a pair of scanning points always consists of two scanning points, also applies to pairs of scanning points introduced in the further procedure.

The identification of the first pair by means of the computation unit can be understood for example to mean that the point and the further point of the first pair are selected by means of the computation unit in such a way that the described condition for the projection of the first connection vector applies. In particular, the computation unit can calculate for a given pair of scanning points, the corresponding connection vector, and the projection thereof into the transmission plane whether the projection is parallel to the longitudinal axis of the sensor system by calculating an angle between the projection and the longitudinal axis of the sensor system and comparing it to zero. The projection of the first connection vector can in particular be considered to be parallel to the longitudinal axis of the sensor system when the corresponding angle is equal to zero or less than a specified tolerance angle.

In particular, owing to the spatial resolution of the reception unit, for example owing to the use of different optical detectors, a pair of scanning points can be found whose connection vector is projected into the transmission plane parallel to the longitudinal axis of the sensor system.

The projection p of the first connection vector v can be expressed, for example, as follows: $p = v - (v^* z_S) z_S$. Here, $z_S$ denotes the direction vector of the z-axis of the sensor coordinate system.

The first angle in particular corresponds to an estimated value for the pitch angle. From this, the pitch angle position can be determined, if necessary with further estimated values for the pitch angle, for example by averaging. Alternatively, the pitch angle position can be equal to the first angle.

The first angle δ can be calculated in particular according to the equation $\delta = \arctan([Z_B - Z_A]/[X_B - X_A])$, where $X_A$ denotes the x-coordinate of the point of the first pair, $Z_A$ denotes its z-coordinate, $X_B$ denotes the x-coordinate of the further point of the first pair, and $Z_B$ denotes its z-coordinate, in each case in the sensor coordinate system.

According to the improved concept, the pitch angle position of the sensor system can be determined online, that is to say during operation of the motor vehicle and without a dedicated calibration template, also referred to as a calibration target. By using different subsets of scanning points of the roadway, that is to say in particular different ground layers, for determining the first angle, no reference data that need to be recorded in advance, for example, are required. In addition, aside from the roadway itself, the improved concept does not require any reference objects in the surrounding area of the motor vehicle, such as road markings or road boundaries, in order to determine the pitch angle position. This is particularly advantageous since the roadway is naturally always available and, accordingly, the ground layers are also permanently or almost permanently available. In comparison with methods that are based on reference data or reference objects, the method according to the improved concept can be carried out almost at any point in time during motor vehicle operation. As a result, the pitch angle position can be determined more or less continuously, which leads to a very much larger number of measurement points and correspondingly to a very much greater accuracy of the determination of the pitch angle position.

In addition, according to the improved concept, it is not necessary to know an installation height of the sensor system. This is advantageous in particular because, in most cases, the installation height of the sensor system is not known or is known only with a low degree of accuracy. This also increases the accuracy of the determination of the pitch angle position.

According to at least one embodiment of the method, light is emitted into the surrounding area of the sensor system by means of the transmission unit of the sensor system in order to generate the point cloud. Reflected components of the light are detected by the reception unit of the sensor system. At least one sensor signal is generated by means of the reception unit based on the detected reflected components. The point cloud is generated by means of the computation unit based on the at least one sensor signal.

The transmission unit includes, for example, the light source, which is designed in particular as a laser light source, for example as a laser diode. The laser light source is designed in particular as an infrared laser. The peak wavelength of the corresponding laser spectrum can for example be 905 nm or 1200 nm.

According to at least one embodiment, the scanning points of the first subset are generated by means of a first optical detector of the sensor system, in particular the reception unit, and the scanning points of the second subset are generated by means of a second optical detector of the sensor system, in particular the reception unit.

The detectors can each include, for example, a photodiode, for example precisely one photodiode. The photodiode can in various embodiments be designed as an avalanche photodiode.

According to at least one embodiment, the first and the second detector are arranged along the z-axis of the sensor coordinate system or along an axis parallel to the z-axis of the sensor coordinate system. Accordingly, as per the design, the first angle is equal to or approximately equal to the pitch angle.

According to at least one embodiment, the computation unit is used to identify a second pair of scanning points, wherein one point of the second pair is part of the first subset, a further point of the second pair is part of the second subset, and a projection of a second connection vector of the second pair into the transmission plane is parallel to the longitudinal axis of the sensor system. A second angle, which the second connection vector encloses with the longitudinal axis of the sensor system, is determined by means of the computation unit. A mean value is determined by means of the computation unit as a function of the first angle and the second angle in order to determine the pitch angle position. The first pair differs in particular from the second pair.

The mean value being determined as a function of the first and the second angle can in particular be understood to mean that the mean value is determined from a set of angles which includes the first and the second angle. In particular, the mean value can also be determined based on additional angles, in particular estimated values for the pitch angle. A greater accuracy of the pitch angle position can be achieved by averaging, in particular by partially compensating for random errors or disturbing influences.

In further embodiments, as described for the second pair, further pairs are identified whose projections of the respective connection vectors in the transmission plane are each parallel to the longitudinal axis of the sensor system. The mean value can then be determined as a function of the correspondingly determined angles.

According to at least one embodiment, the point cloud contains a third subset of scanning points of the roadway, which in particular also corresponds to a ground layer. The third subset can be generated, for example, using a third optical detector of the reception unit, which is arranged, for example, linearly with respect to the first and the second detector.

According to at least one embodiment, the point cloud contains a fourth subset of scanning points of the roadway, which in particular is also a ground layer. The fourth subset can be generated, for example, using a fourth optical detector of the reception unit, which is arranged, for example, linearly with respect to the first, the second and the third detector.

According to at least one embodiment, the computation unit is used to identify a third pair of scanning points, wherein one point of the third pair is part of the first subset, a further point of the third pair is part of the third subset, and a projection of the third connection vector of the third pair into the transmission plane is parallel to the longitudinal axis of the sensor system. The computation unit is used to determine a third angle that the third connection vector encloses with the longitudinal axis of the sensor system, and the computation unit is used to determine the mean value as a function of the first and third angles, for example the first, the second, and the third angles, to determine the pitch angle position.

According to at least one embodiment, a fourth pair of scanning points is identified by means of the computation unit, wherein one point of the fourth pair is part of the third subset and a further point of the fourth pair is part of the fourth subset. A projection of a fourth connection vector of the fourth pair into the transmission plane is parallel to the longitudinal axis of the sensor system. The computation unit is used to determine a fourth angle that the fourth connection vector encloses with the longitudinal axis of the sensor system, and to determine the mean value as a function of the first angle and the fourth angle, in particular as a function of the first, the second, the third, and the fourth angles, to determine the pitch angle position.

According to at least one embodiment, the sensor system is used to generate a further point cloud, which contains a first further subset of scanning points of the roadway and a second further subset of scanning points of the roadway, wherein the point cloud and the further point cloud are generated during different time periods. The computation unit is used to identify a further pair of scanning points, wherein one point of the further pair is part of the first further subset, a further point of the further pair is part of the second further subset, and a projection of a further connection vector of the further pair into the transmission plane is parallel to the longitudinal axis of the sensor system. A further angle, which the further connection vector encloses with the longitudinal axis of the sensor system, is determined by means of the computation unit. A mean value, in particular the mean value, is determined by means of the computation unit as a function of the first angle and the further angle in order to determine the pitch angle position.

For example, the mean value can be determined as a function of the first angle, the further angle, and the second, the third, and/or the fourth angle.

Since the point clouds are generated during different time periods, they generally correspond to different vehicle positions and thus to different scanning points on the roadway. In this way, different external disturbing influences can be better taken into account or compensated for. This ultimately leads to a further increased accuracy in determining the pitch angle position.

The various embodiments that have been described with regard to the second and third pairs or the third and fourth subsets of scanning points can be transferred directly to the further point cloud and corresponding further third and fourth subsets of scanning points or further second and third pairs of scanning points.

According to at least one embodiment, the yaw angle position of the sensor system is determined or provided, for example determined by means of the computation unit or provided to the computation unit. Determining the yaw angle position can include, for example, estimating, measuring, or neglecting the yaw angle.

According to at least one embodiment, the point cloud is determined by means of the sensor system as a function of the yaw angle position.

In other words, the point cloud is generated by means of the computation unit in such a way that the coordinates of the scanning points with respect to the yaw angle are calibrated or normalized coordinates. In other words, a point cloud calibrated with respect to the yaw angle is used to determine the pitch angle position according to the improved concept.

According to at least one embodiment, the further point cloud is likewise generated by means of the sensor system as a function of the yaw angle position.

The yaw angle can be determined for example in such a way that an initial sensor coordinate system is determined on the basis of at least two of the scanning points generated with the first detector. A reference coordinate system can be determined on the basis of two corresponding scanning points of different detectors. The two scanning points correspond here for example to the same emission angle. The yaw angle can be determined by comparing the initial sensor coordinate system with the reference coordinate system.

Any other methods for determining the yaw angle can be used.

In particular, it is not necessary for the yaw angle to be determined online, like the pitch angle. The yaw angle can be determined, for example, on the basis of a specified calibration target or a calibration template in a test environment.

According to a further independent aspect of the improved concept, an active optical sensor system for installation in a motor vehicle is specified. The sensor system has a transmission unit, a reception unit, and a computation unit. The transmission unit is configured to emit light into a surrounding area of the sensor system. The reception unit is configured to detect reflected components of the light and to generate at least one sensor signal based on the detected reflected components. The computation unit is coupled to the reception unit in order to receive the at least one sensor signal. The computation unit is configured to generate, based on the at least one sensor signal, a point cloud, which contains a first subset of scanning points of a roadway on which the motor vehicle is located, and a second subset of scanning points of the roadway. The computation unit is configured to identify a first pair of scanning points, wherein one point of the first pair is part of the first subset, a further point of the first pair is part of the second subset, and a projection of a first connection vector of the first pair into a transmission plane of the sensor system is parallel to a longitudinal axis of the sensor system. The computation unit is configured to determine a first angle, which the first connection vector encloses with the longitudinal axis of the sensor system, in order to determine a pitch angle position of the sensor system.

The sensor system is embodied in particular as a lidar system.

The transmission unit includes in particular a laser source, for example a semiconductor laser, in particular an infrared laser.

According to at least one embodiment of the active optical sensor system, the reception unit has a first optical detector, in particular a first photodiode, for example a first avalanche photodiode, wherein the first optical detector is configured to detect first reflected components of the light and, based thereon, to generate a first sensor signal of the at least one sensor signal. The reception unit has a second optical detector, in particular a second photodiode, for example a second avalanche photodiode, wherein the second optical detector is configured to detect second reflected components of the light and, based thereon, to generate a second sensor signal of the at least one sensor signal. The computation unit is configured to generate the first subset based on the first sensor signal and to generate the second subset based on the second sensor signal.

The first reflected components and the second reflected components are here in particular each a part of the reflected components of the light that are detected by the reception unit.

According to at least one embodiment, the first optical detector and the second optical detector are arranged along the normal axis or along an axis parallel to the normal axis of the sensor system.

In particular, spatial positions of the optical detectors in the sensor coordinate system differ only in their z-coordinates.

According to at least one embodiment, the computation unit is configured to identify a second pair of scanning points, wherein one point of the second pair is part of the first subset, a further point of the second pair is part of the second subset, and a projection of a second connection vector of the second pair into the transmission plane is parallel to the longitudinal axis of the sensor system. The computation unit is configured to determine a second angle that the second connection vector encloses with the longitudinal axis of the sensor system and to determine a mean value as a function of the first angle and the second angle in order to determine the pitch angle position.

According to at least one embodiment, the computation unit is configured to generate, based on the at least one sensor signal, a further point cloud, which contains a further first subset of scanning points of the roadway and a further second subset of scanning points of the roadway, wherein the point cloud and the further point cloud are generated during different time periods. The computation unit is configured to identify a further pair of scanning points, wherein one point of the further pair is part of the first further subset, a further point of the further pair is part of the second further subset, and a projection of a further connection vector of the further pair into the transmission plane is parallel to the longitudinal axis of the sensor system. The computation unit is configured to determine a further angle that the further connection vector encloses with the longitudinal axis of the sensor system and to determine a mean value as a function of the first angle and the further angle in order to determine the pitch angle position.

According to at least one embodiment, the computation unit is configured to generate the point cloud as a function of a yaw angle position of the sensor system.

Further embodiments of the active optical sensor system according to the improved concept result directly from the various refinements of the method according to the improved concept, and vice versa. In particular, the active optical sensor system can be configured or programmed to carry out a method according to the improved concept, or the sensor system according to the improved concept carries out a method according to the improved concept.

According to a further independent aspect of the improved concept, a motor vehicle with an active optical sensor system according to the improved concept is specified.

According to a further independent aspect of the improved concept, a computer program with instructions is specified. When the computer program is executed by an active optical sensor system according to the improved concept, in particular by the computation unit of the sensor system, the instructions cause the sensor system to carry out a method according to the improved concept.

According to a further independent aspect of the improved concept, a computer-readable storage medium is specified, on which a computer program according to the improved concept is stored.

Further features of the invention emerge from the claims, the figures and the description of the figures. The features and combinations of features that are cited in the description above and also the features and combinations of features that are cited in the description of the figures below and/or shown in the figures alone can be used not only in the respectively indicated combination but also in other combinations without departing from the scope of the invention. Embodiments of the invention that are not explicitly shown and explained in the figures, but emerge and are producible from the explained embodiments by virtue of separate combinations of features, are therefore also intended to be regarded as encompassed and disclosed. Embodiments and combinations of features which therefore do not have all the features of an originally formulated independent claim are also intended to be regarded as disclosed. Furthermore, embodiments and combinations of features that go beyond or differ from the combinations of features set out in the back-references of the claims are intended to be regarded as disclosed, in particular by the embodiments set out above.

In the figures:

FIG. 1 shows a motor vehicle 1, which has an active optical sensor system 2 according to the improved concept.

Figure 1:
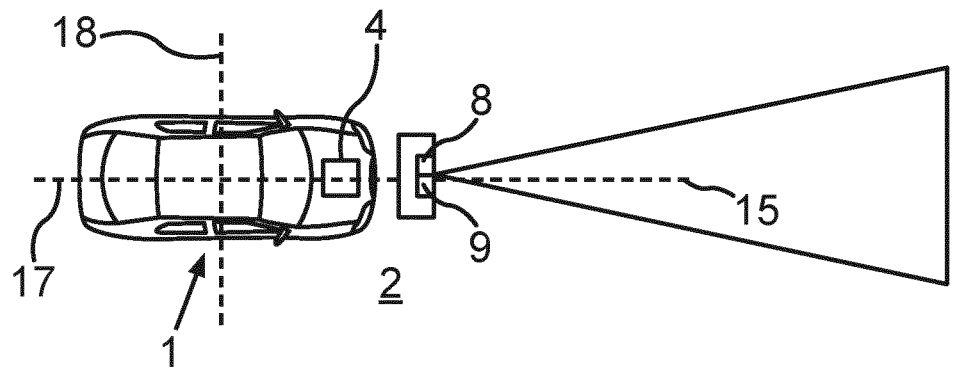
FIG. 1 shows a motor vehicle with a schematic illustration of an exemplary embodiment of an active optical sensor system according to the improved concept.

The sensor system 2 is embodied as a lidar system. A nominal alignment of the sensor system 2 is given, for example, by a longitudinal axis 17 of the motor vehicle 1, a transverse axis 18 of the motor vehicle 1, and a normal axis (not shown) of the motor vehicle 1, which is perpendicular to its longitudinal and transverse axes 17, 18.

The top view of FIG. 1 shows a projection of a longitudinal axis 15 of the sensor system 2 into the plane spanned by the longitudinal axis 17 and the transverse axis 18 of the motor vehicle 1. In particular, it is assumed that the longitudinal axis 15 of the sensor system 2 lies in a plane spanned by the longitudinal axis 17 of the motor vehicle 1 and the normal axis of the motor vehicle 1 such that the projection of the longitudinal axis 15 of the sensor system 2 is parallel to the longitudinal axis 17 of the motor vehicle 1. This assumption does not represent any restriction of generality, since it is assumed that a yaw angle compensation has already been carried out previously or that the yaw angle of the sensor system with respect to the nominal alignment is approximately equal to zero.

The sensor system 2 has a transmission unit 8, for example with a laser source, in order to emit light at different emission angles within a transmission plane of the sensor system 2. Correspondingly, the emission direction at an emission angle of zero degrees is equal to the longitudinal axis 15 of the sensor system 2.

The transmission plane is defined in particular by the plane that is spanned by the longitudinal axis 15 of the sensor system 2 and a transverse axis of the sensor system 2. Without restricting the generality, the transverse axis of the sensor system 2 can be viewed as being identical to or parallel to the transverse axis 18 of the motor vehicle 1. Deviations of the transverse axis of the sensor system 2 from the transverse axis of the motor vehicle 1 correspond to a roll angle of the sensor system 2 that is different from zero. However, the method steps described below for determining a pitch angle of the sensor system 2 are independent of the roll angle.

The transmission plane thus corresponds to the plane spanned by the longitudinal axis 17 of the motor vehicle 1 and the transverse axis 18 of the motor vehicle 1, rotated by an angle, to be precise the pitch angle, about the transverse axis 18 of the motor vehicle 1.

In other words, the longitudinal axis 15 of the sensor system 2 encloses the pitch angle with the longitudinal axis 17 of the motor vehicle 1.

The active optical sensor system 2 additionally has a computation unit 4 and a reception unit 9. The computation unit 4 is connected to the reception unit 9 and, for example, to the transmission unit 8. In particular, the computation unit 4 can control the transmission unit 8 to emit the light 3. The reception unit 9 can detect reflected components 5 of the light 3 and, based thereon, generate at least one sensor signal and transmit it to the computation unit 4.

Figure 2:
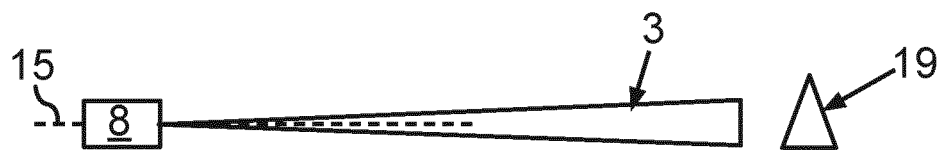
FIG. 2 shows a transmission unit of an exemplary embodiment of an active optical sensor system according to the improved concept.
Figure 2:
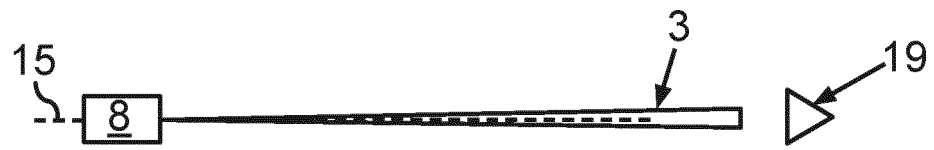

FIG. 2 schematically shows the transmission unit 8 of the sensor system 2. In addition, light 3 emitted by the transmission unit 8, in particular laser beams, is shown. In addition, an object 19 in a surrounding area of the sensor system 2 is shown schematically in FIG. 2.

The upper depiction in FIG. 2 corresponds for example to a viewing direction parallel to the transverse axis 18 of the motor vehicle 1 onto the transmission unit 8, and the lower depiction in FIG. 2 corresponds for example to a viewing direction parallel to the normal axis of the sensor system 2 onto the transmission unit 8.

As can be seen in the depictions in FIG. 2, a respective beam expansion of the laser beams can be different in different planes.

Figure 3:
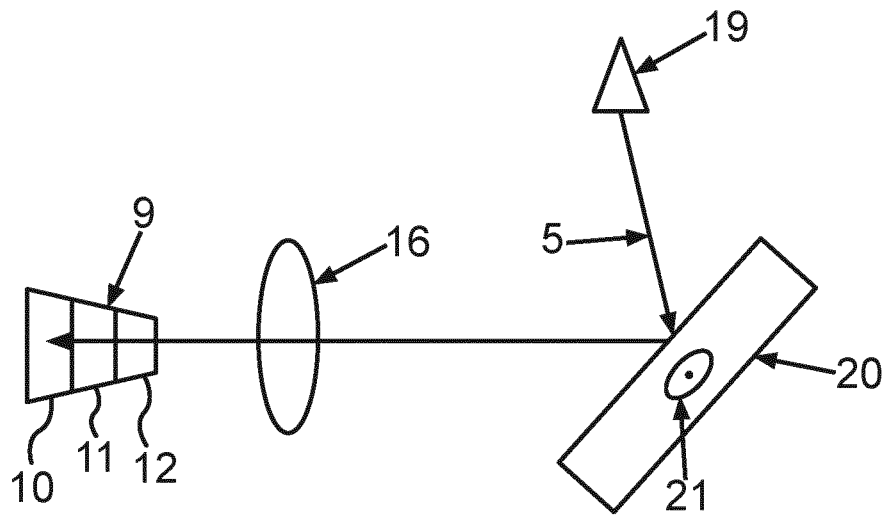
FIG. 3 shows a reception unit of a further exemplary embodiment of an active optical sensor system according to the improved concept.

FIG. 3 schematically shows the reception unit 9, a lens 16, and a mirror 20 of the sensor system 2.

The reception unit 9 includes at least two, in the example of FIG. 3 three, optical detectors 10, 11, 12, which are in particular arranged linearly next to one another along an axis parallel to the normal axis of the sensor system 2 and are designed, for example, as avalanche photodiodes. The reception unit 9 additionally has a shaft 21, which is mounted rotatably and connected to the mirror 20, with the result that the mirror 20 is rotatable about the rotation axis.

The view in FIG. 3 can for example be understood as a top view, that is to say in a viewing direction parallel to the normal axis of the sensor system 2, of the sensor system 2. The detectors 10, 11, 12 are shown in a distorted perspective for clarification purposes.

In an actual top view, the detectors 10, 11, 12 would lie one above another and for example cover one another.

The transmission unit 8 is not shown in FIG. 3, but can be arranged with respect to the mirror 20 in such a way that the emission angle of the light 3 can be varied when the mirror 20 is rotated about the rotation axis. The rotation axis and the shaft 21 are therefore aligned in particular perpendicular to the transmission plane.

A receiving path for the reflected components 5 of the light beams 3, which were reflected by the object 19, for example, leads via the mirror 20 and the lens 16 to the reception unit 9. The reflected components 5 are then captured by at least one of the detectors 10, 11, 12.

By rotating the mirror 20 about the rotation axis, each of the detectors 10, 11, 12 can detect reflected components 5 of the light 3 incident from different directions. The instantaneous position of the mirror 20 can be determined, for example, via a rotary encoder (not shown) coupled to the shaft 21.

Since the instantaneous position of the mirror 20 is known for example at every point in time, a set of scanning points, which is also referred to as point cloud 6, can be generated over the temporal sequence of the detected light beams. In this case, a subset of the scanning points or a subset of the point cloud 6 is generated by means of each detector 10, 11, 12. A subset of scanning points that are generated for different emission angles or angular positions of the mirror 20 and correspondingly for different points in time can also be referred to as the layer of scanning points. If the object 19 is a roadway on which the motor vehicle 1 is located, the layer is also referred to as the ground layer.

Figure 4:
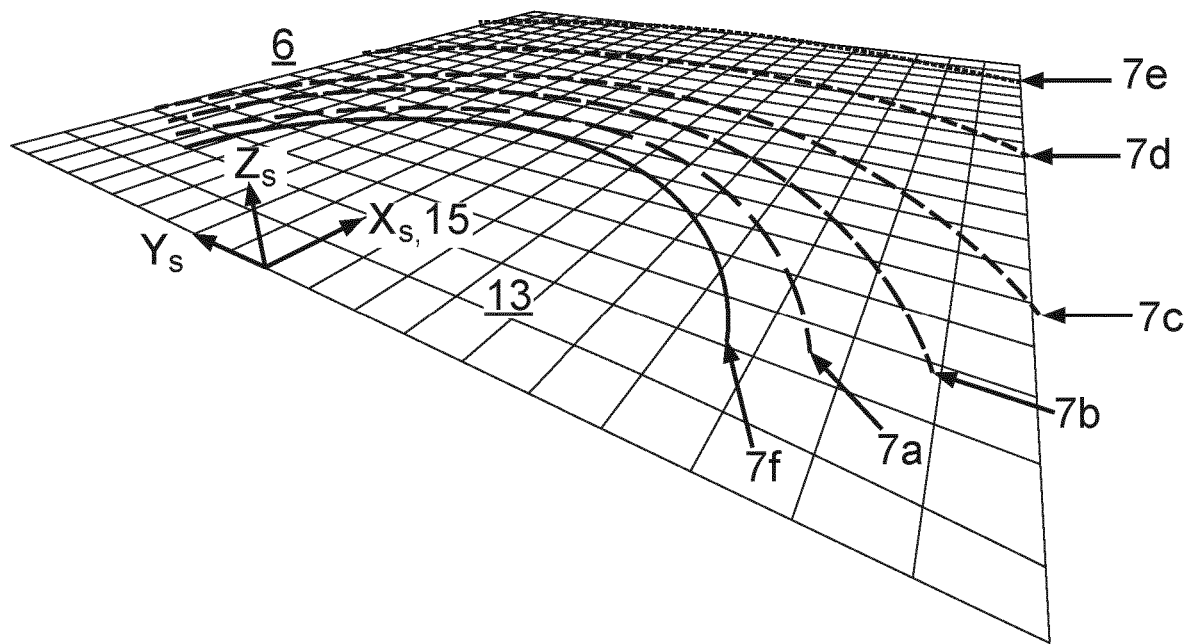
FIG. 4 shows a schematic illustration of a point cloud in an exemplary embodiment of a method according to the improved concept.

The point cloud 6 is shown by way of example in FIG. 4 and is in particular a three-dimensional point cloud, since, in addition to the respective emission angles and the information relating to which detector 10, 11, 12 the respective scanning point is based on, the distance of the object 19 can also be determined via a time-of-flight measurement.

Different layers of the point cloud 7a, 7b, 7c, 7d, 7e, 7f are shown in FIG. 4 by different types of lines. The scanning points shown of the point cloud 6 were generated, for example, on the basis of reflected components of the light 3, which were reflected by the roadway 13. The layers 7a, 7b, 7c, 7d, 7e, 7f are accordingly ground layers. Further layers of the point cloud 6 which may be present and do not represent ground layers are not shown for the sake of clarity. FIG. 4 illustrates a total of six layers 7a, 7b, 7c, 7d, 7e, 7f by way of example, and therefore the reception unit 9 has at least six detectors in this case.

In addition, the sensor coordinate system is shown in FIG. 4. An X-axis $X_S$ of the sensor coordinate system corresponds to the longitudinal axis 15 of the sensor system 2, a Y-axis $Y_S$ corresponds to the transverse axis of the sensor system 2, and a Z-axis $Z_S$ corresponds to the normal axis of the sensor system 2.

Figure 5:
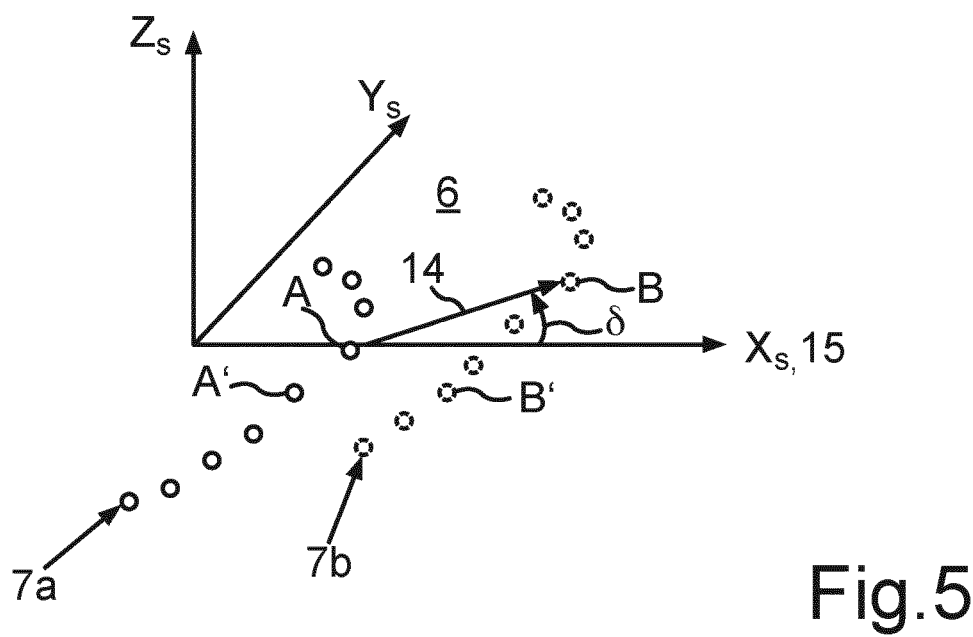
FIG. 5 shows a further illustration of the point cloud from FIG. 4.

FIG. 5 shows two of the ground layers 7a, 7b in the sensor coordinate system. For illustrative purposes, only a few scanning points of the layers 7a, 7b are shown. In order to determine a pitch angle position of the sensor system 2 according to the improved concept, the computation unit 4 identifies a point A of the first ground layer 7a and a point B of the second ground layer 7b. FIG. 5 shows a connection vector 14, which leads from point A to point B.

Figure 6:
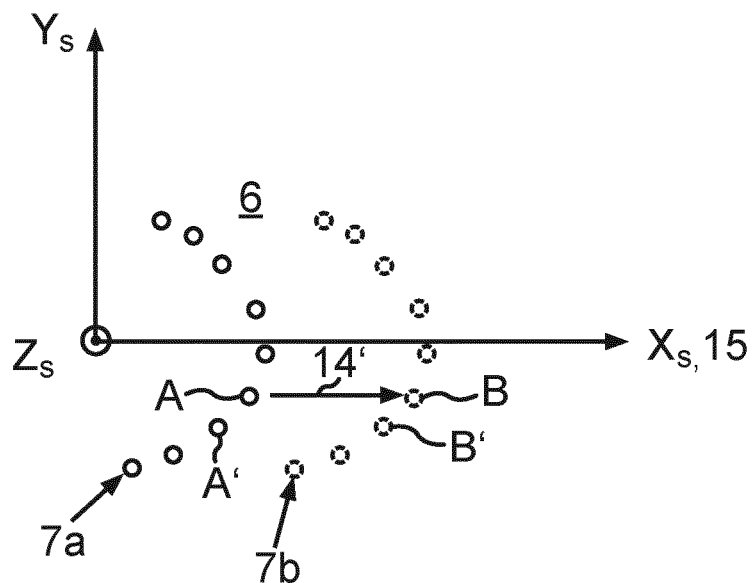
FIG. 6 shows a further illustration of the point cloud from FIGS. 4 and 5.

FIG. 6 illustrates the same situation as in FIG. 5, but from a viewing direction parallel to the Z-axis $Z_S$. Here, a projection 14' of the connection vector 14 into the $X_S$-$Y_S$ plane is shown. The points A, B are identified by the computation unit 4 by the projection 14 being parallel or approximately parallel to the longitudinal axis 15 of the sensor system 2, that is to the $X_S$-axis.

Figure 7:
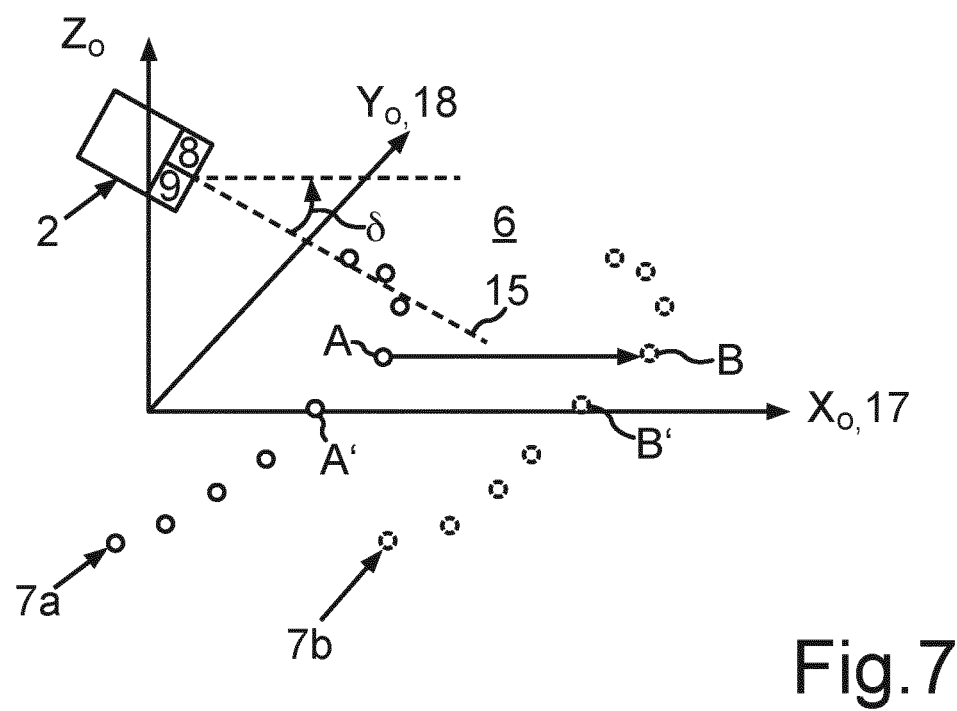
FIG. 7 shows a further illustration of the point cloud from FIGS. 4, 5 and 6.

FIG. 7 likewise shows the same situation as in FIG. 5 and FIG. 6, but in the vehicle coordinate system, which has an X-axis $X_0$, a Y-axis $Y_0$ and a z-axis $Z_0$. The X-axis $X_0$ here corresponds to the longitudinal axis 17 of the motor vehicle 1, the Y-axis $Y_0$ corresponds to the transverse axis 18 of the motor vehicle 1, and the Z-axis $Z_0$ corresponds to the normal axis of the motor vehicle 1.

FIG. 7 additionally schematically illustrates the sensor system 2 with the transmission unit 8 and the reception unit 9, and also the longitudinal axis 15 of the sensor system 2. As explained above, the longitudinal axis 15 of the sensor system 2 and the longitudinal axis 17 of the motor vehicle 1 enclose an angle which corresponds to the pitch angle $\delta$.

As a rule, it can be assumed with a high degree of accuracy that the roadway 13 is an approximately flat surface. In addition, the plane spanned by the longitudinal axis 17 of the motor vehicle 1 and the transverse axis 18 of the motor vehicle 1 is parallel to the surface of the roadway 13. Accordingly, it follows that the connection vector 14 does not enclose an angle with the $X_0$-$Y_0$ plane of the vehicle coordinate system, i.e. is approximately parallel to said plane. In other words, the connection vector 14 encloses with the $X_S$-$Y_S$ plane of the sensor coordinate system, especially with the $X_S$ direction of the sensor coordinate system or the longitudinal axis 15 of the sensor system 2, the same angle $\delta$ as the longitudinal axis 15 of the sensor system 2 encloses with the longitudinal axis 17 of the motor vehicle 1.

The pitch angle can therefore be determined by means of the computation unit 4 approximately as that angle which the connection vector 14 encloses with the $X_S$-axis. In particular, the pitch angle $\delta$ is given by $\delta=\arctan([Z_B-Z_A]/[X_B-X_A])$, wherein $X_A$ denotes the x-coordinate of point A, $Z_A$ denotes its z-coordinate, $X_B$ denotes the x-coordinate of point B and $Z_B$ denotes its z-coordinate.

The steps described for determining the pitch angle $\delta$ can be repeated for different pairs of scanning points of the different ground layers 7a, 7b, 7c, 7d, 7e, 7f. The determined angle values can be averaged, for example, in order to achieve greater accuracy.

As an example, a further pair of scanning points A', B' is shown in FIG. 5, FIG. 6 and FIG. 7, the connection vector of which likewise lies approximately in the $X_S$-$Z_S$-axis of the sensor coordinate system. Correspondingly, the pitch angle can also in this case be determined in the manner described.

The steps described can be repeated, for example, at different points in time in order to attain a further increase in accuracy.

The improved concept provides a possibility for determining the pitch angle position of an active optical sensor system, which makes increased accuracy possible. One advantage of the improved concept is that the installation height of the sensor system in the motor vehicle does not have to be known, which rules out corresponding inaccuracies and resulting measurement errors. Since the ground layers used to determine the pitch angle position are usually continuously available during operation of the vehicle, the number of possible measurements for determining the pitch angle position can be greatly increased, which results in a significant increase in the accuracy of the determination of the pitch angle position.

The improved concept makes particular use of the fact that, with a pitch angle as can realistically be expected, there are always a plurality of ground layers in the corresponding point cloud.

The invention claimed is:

1. A method for determining a pitch angle position of an active optical sensor system, which is mounted on a motor vehicle located on a roadway, the method comprising:
generating a point cloud containing a first subset of scanning points of the roadway and a second subset of scanning points of the roadway, wherein generating the point cloud comprises:
emitting light into a surrounding area of the sensor system by a transmission unit of the sensor system;
detecting reflected components of the light by a reception unit of the sensor system;
generating at least one sensor signal by the reception unit based on the detected reflected components; and
generating the point cloud by a computation unit of the sensor system based on the at least one sensor signal;
identifying a first pair of scanning points by the computation unit, wherein one point of the first pair is part of the first subset, a further point of the first pair is part of the second subset, and a projection of a first connection vector of the first pair into a transmission plane of the sensor system is parallel to a longitudinal axis of the sensor system; and
determining a first angle, which the first connection vector encloses with the longitudinal axis of the sensor system by the computation unit in order to determine the pitch angle position.

2. The method as claimed in claim 1, further comprising:
generating the scanning points of the first subset by a first optical detector of the sensor system; and
generating the scanning points of the second subset by a second optical detector of the sensor system.

3. The method as claimed in claim 1,
wherein a second pair of scanning points is identified by the computation unit,
wherein one point of the second pair is part of the first subset, a further point of the second pair is part of the second subset, and a projection of a second connection vector of the second pair into the transmission plane is parallel to the longitudinal axis of the sensor system;
a second angle, which the second connection vector encloses with the longitudinal axis of the sensor system, is determined by the computation unit; and a mean value is determined by means of the computation unit as a function of the first angle and the second angle in order to determine the pitch angle position.

4. The method as claimed in claim 1,
wherein the sensor system is used to generate a further point cloud, which contains a first further subset of scanning points of the roadway and a second further subset of scanning points of the roadway, wherein the point cloud and the further point cloud are generated during different time periods;
the computation unit is used to identify a further pair of scanning points,
wherein one point of the further pair is part of the first further subset, a further point of the further pair is part of the second further subset, and a projection of a further connection vector of the further pair into the transmission plane is parallel to the longitudinal axis of the sensor system;
a further angle, which the further connection vector encloses with the longitudinal axis of the sensor system, is determined by the computation unit; and
a mean value is determined by the computation unit as a function of the first angle and the further angle in order to determine the pitch angle position.

5. The method as claimed in claim 1, wherein the point cloud is generated by the sensor system as a function of a yaw angle position of the sensor system.

6. An active optical sensor system for mounting on a motor vehicle, comprising:
a transmission unit, which is configured to emit light into a surrounding area of the sensor system;
a reception unit, which is configured to detect reflected components of the light and to generate at least one sensor signal based on the detected reflected components; and
a computation unit, which is coupled to the reception unit in order to receive the at least one sensor signal;
wherein the computation unit is configured to:
generate, based on the at least one sensor signal, a point cloud, which contains a first subset of scanning points of a roadway on which the motor vehicle is located, and a second subset of scanning points of the roadway;
identify a first pair of scanning points, wherein one point of the first pair is part of the first subset, a further point of the first pair is part of the second subset, and a projection of a first connection vector of the first pair into a transmission plane of the sensor system is parallel to a longitudinal axis of the sensor system; and
determine a first angle, which the first connection vector encloses with the longitudinal axis of the sensor system, in order to determine a pitch angle position of the sensor system.

7. The active optical sensor system as claimed in claim 6, wherein:
the reception unit has a first optical detector, which is configured to detect first reflected components of the light and, based thereon, to generate a first sensor signal of the at least one sensor signal,
the reception unit has a second optical detector, which is configured to detect second reflected components of the light and, based thereon, to generate a second sensor signal of the at least one sensor signal, and
the computation unit is configured to generate the first subset based on the first sensor signal and to generate the second subset based on the second sensor signal.

8. The active optical sensor system as claimed in claim 7, wherein the first optical detector and the second optical detector are arranged along a direction parallel to a normal axis of the sensor system.

9. The active optical sensor system as claimed in claim 6, wherein the computation unit is configured to:
identify a second pair of scanning points, wherein one point of the second pair is part of the first subset, a further point of the second pair is part of the second subset, and a projection of a second connection vector of the second pair into the transmission plane is parallel to the longitudinal axis of the sensor system;
determine a second angle, which the second connection vector encloses with the longitudinal axis of the sensor system, and
determine a mean value as a function of the first angle and the second angle in order to determine the pitch angle position.

10. The active optical sensor system as claimed in claim 6, wherein the computation unit is configured to:
generate, based on the at least one sensor signal, a further point cloud, which contains a first further subset of scanning points of the roadway and a second further subset of scanning points of the roadway, wherein the point cloud and the further point cloud are generated during different time periods,
identify a further pair of scanning points, wherein one point of the further pair is part of the first further subset, a further point of the further pair is part of the second further subset, and a projection of a further connection vector of the further pair into the transmission plane is parallel to the longitudinal axis of the sensor system,
determine a further angle, which the further connection vector encloses with the longitudinal axis of the sensor system, and
determine a mean value as a function of the first angle and the further angle in order to determine the pitch angle position.

11. The active optical sensor system as claimed in claim 6, wherein the computation unit is configured to generate the point cloud as a function of a yaw angle position of the sensor system.

12. A non-transitory computer readable medium storing instructions executable by a computer processor, the instructions comprising functionality for:
generating a point cloud containing a first subset of scanning points of a roadway and a second subset of scanning points of the roadway, wherein generating the point cloud comprises:
emitting light into a surrounding area of an active optical sensor system mounted on a motor vehicle by a transmission unit of the sensor system;
detecting reflected components of the light by a reception unit of the sensor system;
generating at least one sensor signal by the reception unit based on the detected reflected components; and
generating the point cloud by a computation unit of the sensor system based on the at least one sensor signal;
identifying a first pair of scanning points by the computation unit, wherein one point of the first pair is part of the first subset, a further point of the first pair is part of the second subset, and a projection of a first connection vector of the first pair into a transmission plane of the sensor system is parallel to a longitudinal axis of the sensor system; and determining a first angle, which the first connection vector encloses with the longitudinal axis of the sensor system by the computation unit in order to determine a pitch angle position of the sensor system.

* * * * *